(12) United States Patent
Andoh (10) Patent No.: US 7,562,270 B2
(45) Date of Patent: Jul. 14, 2009

(54) MEDIUM DRIVE AND METHOD OF GENERATING A DEFECT MAP FOR REGISTERING POSITIONS OF DEFECTS ON A MEDIUM

(75) Inventor: Haruo Andoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 358 days.

(21) Appl. No.: 11/654,045

(22) Filed: Jan. 16, 2007

(65) Prior Publication Data

US 2007/0174564 A1    Jul. 26, 2007

(30) Foreign Application Priority Data

Jan. 20, 2006    (JP)    ............... 2006-013156

(51) Int. Cl.
*G11C 29/00*    (2006.01)
(52) U.S. Cl. ........................ 714/723; 711/159
(58) Field of Classification Search ................ 382/132; 360/53; 711/170, 159; 714/8, 6, 723; 365/189.05
See application file for complete search history.

(56) References Cited

U.S. PATENT DOCUMENTS

| | | | |
|---|---|---|---|
| 6,529,618 B1 * | 3/2003 | Ohara et al. ................ 382/132 |
| 6,654,904 B1 | 11/2003 | Andoh et al. |
| 6,850,379 B2 | 2/2005 | Andoh et al. |
| 6,862,150 B1 * | 3/2005 | Eto ............................. 360/53 |
| 6,957,360 B2 * | 10/2005 | Sims et al. ..................... 714/8 |
| 7,188,226 B2 * | 3/2007 | de Brebisson et al. ....... 711/170 |
| 2005/0097393 A1 * | 5/2005 | de Brebisson et al. .......... 714/8 |
| 2005/0270856 A1 * | 12/2005 | Earhart et al. .......... 365/189.05 |

FOREIGN PATENT DOCUMENTS

| | | |
|---|---|---|
| JP | 11-327809 | 11/1999 |
| JP | 2001-023310 | 1/2001 |
| JP | 2001-175424 | 6/2001 |
| JP | 2002-268829 | 9/2002 |

* cited by examiner

*Primary Examiner*—David Ton
(74) *Attorney, Agent, or Firm*—Townsend and Townsend and Crew LLP; John Henkhaus (57) ABSTRACT

A hard disk drive (HDD) according to an embodiment of the present invention uses three primary defect map (PDM) formats: a single-sector entry format; a multi-sector entry format; and a two-dimensional sector entry format. Methods of registering defective sectors in each such format are illustrated. Defects can be appropriately registered in a limited RAM capacity by selecting an appropriate format according to states of the defects on a magnetic disk.

12 Claims, 11 Drawing Sheets

| ENTRY NO | ABSOLUTE BLOCK ADDRESS (WORD) |
|---|---|
| 0 | ABA_0 |
| 1 | ABA_1 |
| 2 | ABA_2 |
| ⋮ | ⋮ |
| 598 | |
| 599 | |

Fig.6

| ENTRY NO | ABSOLUTE BLOCK ADDRESS (WORD) | SECTOR COUNT (BYTE) |
|---|---|---|
| 0 | ABA_0 | SCNT_0 |
| 1 | ABA_1 | SCNT_1 |
| 2 | ABA_2 | SCNT_2 |
| ⋮ | ⋮ | ⋮ |
| 398 | | |
| 399 | | |

Fig.7

| ENTRY NO | ABSOLUTE BLOCK ADDRESS (WORD) | SECTOR COUNT (BYTE) | TRACK COUNT (BYTE) |
|---|---|---|---|
| 0 | ABA_0 | SCNT_0 | TCNT_0 |
| 1 | ABA_1 | SCNT_1 | TCNT_1 |
| 2 | ABA_2 | SCNT_2 | TCNT_2 |
| ... | ... | ... | ... |
| 298 | | | |
| 299 | | | |

Fig.8

SINGLE SECTOR ENTRY    1 SECTOR

| ABSOLUTE BLOCK ADDRESS (WORD) |

MULTI SECTOR ENTRY    256 SECTORS

| ABSOLUTE BLOCK ADDRESS (WORD) | SECTOR COUNT (BYTE) |

2 DIMENSION ENTRY    65536 SECTORS

| ABSOLUTE BLOCK ADDRESS (WORD) | SECTOR COUNT (BYTE) | TRACK COUNT (BYTE) |

Fig.9

| SINGLE SECTOR ENTRY |
|---|
| 2 BYTE / ENTRY |
| MAX 600 ENTRY |
| ALL ENTRY |

| MULTI SECTOR ENTRY |
|---|
| 3 BYTE / ENTRY |
| MAX 400 ENTRY |
| 2/3 ENTRY |

| 2D ENTRY |
|---|
| 4 BYTE / ENTRY |
| MAX 300 ENTRY |
| 1/2 ENTRY |

MEDIUM DRIVE AND METHOD OF GENERATING A DEFECT MAP FOR REGISTERING POSITIONS OF DEFECTS ON A MEDIUM

CROSS-REFERENCE TO RELATED APPLICATION

The instant nonprovisional patent application claims priority to Japanese Patent Application 2006-013156, filed Jan. 20, 2006 and incorporated by reference herein for all purposes.

BACKGROUND OF THE INVENTION

Embodiments in accordance with the present invention relate to generation of a defect map for registering positions of defects on a medium.

The devices using an optical disk, a magnetic tape, or the like, are known as medium devices. Among them, a hard-disk drive (HDD) is most commonly used as a storage device in computers, and the HDD is one storage device essential for current computer systems. In addition, the use of the HDD is not limited to computer systems, and because of its excellent characteristics, is increasingly expanding into such products as moving-picture recording/reproducing devices, car navigation systems, hand-held phones, and removable memories used in digital cameras.

For such a HDD, high reliability is requested. Accordingly, its manufacturing processes include the process of testing for defects on the surface of a magnetic disk. One of magnetic disk tests is a test performed by the manufactured HDD itself to detect defects on magnetic disks in the HDD. For example, the HDD identifies defects on the magnetic disks by writing data onto the data tracks of each magnetic disk and reading out the written data.

This test is performed on the overall area of each recording surface of the magnetic disks of the HDD. Defective sectors that have been detected are registered on a primary defect map (PDM). The HDD does not access and skips the defective sectors that have been registered on the primary defect map.

Several types of formats are known as PDM formats. In one typical PDM format, one defective sector is registered in one entry (hereinafter, called "single-sector entry format"). In this format, the number of entries and the amount of data in the PDM increase in proportion to an increase in the number of defective sectors. However, since the memory capacity allocated to the PDM is limited, the number of defective sectors that can be registered on the PDM is also limited.

Accordingly, several other PDM formats have been proposed for registering a larger number of defective sectors in a limited memory capacity. A format proposed in Patent Document 1 (Japanese Laid-Open Patent Application Publication No. 2001-23310), for example, is a format in which a one-dimensional defective sector array consisting of multiple data sectors is registered in one entry (hereinafter, called "multi-sector entry format"). A format proposed in Patent Document 2 (Japanese Laid-Open Patent Application Publication No. 2002-268829) is a format in which a two-dimensional array consisting of multiple sectors is registered in one entry (hereinafter, called "two-dimensional entry format").

BRIEF SUMMARY OF THE INVENTION

Figure 4:
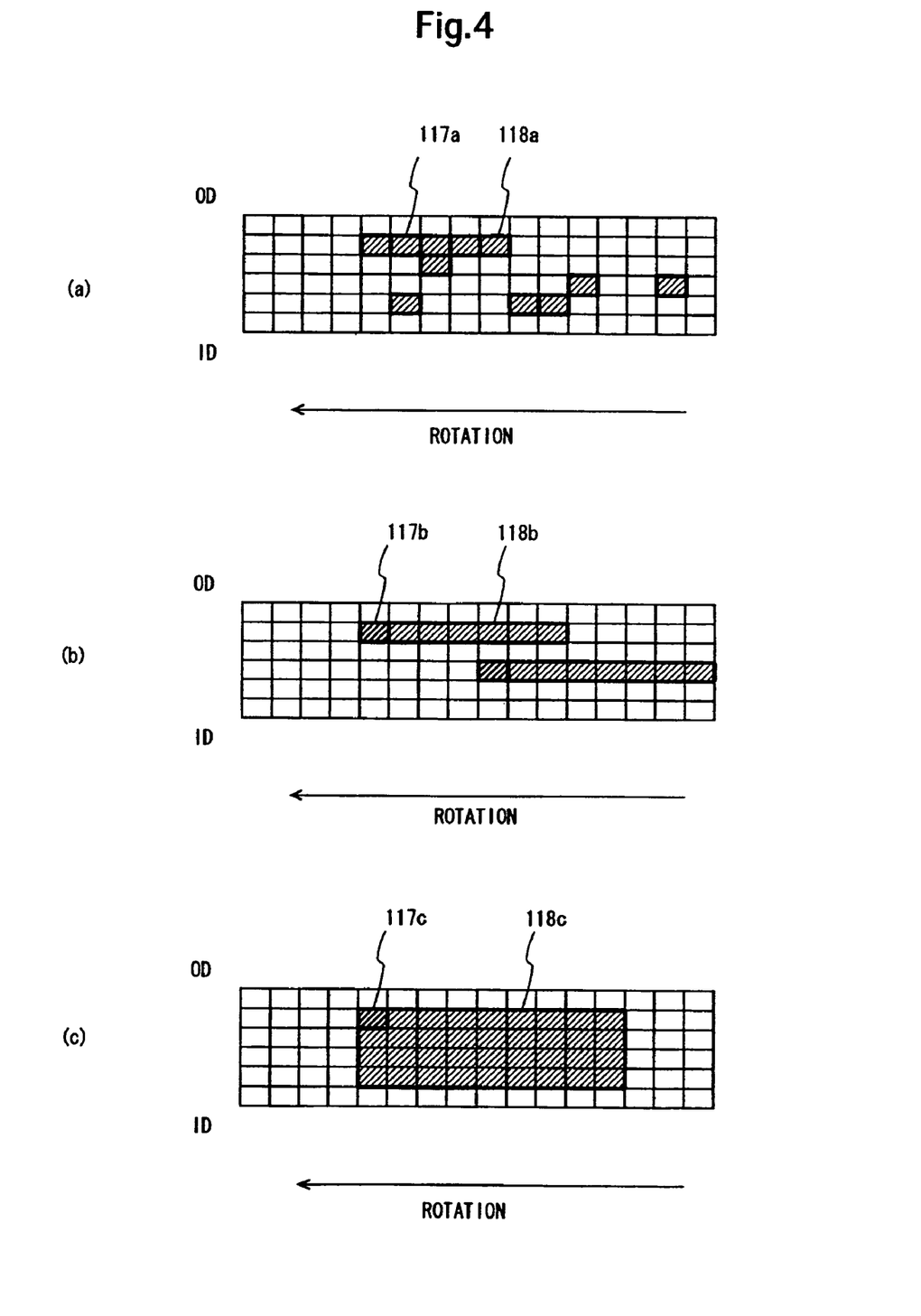
FIGS. 4(a) to 4(c) schematically show methods of registering defective sectors in each PDM format according to an embodiment of the present invention, wherein FIG. 4(a) schematically shows a single-sector entry format, FIG. 4(b) a multi-sector entry format, and FIG. 4(c) a two-dimensional sector entry format.

A hard disk drive (HDD) according to an embodiment of the invention, uses three primary defect map (PDM) formats: a single-sector entry format; a multi-sector entry format; and a two-dimensional sector entry format. FIGS. 4(a) to 4(c) schematically show methods of registering defective sectors in each such format. FIG. 4(a) shows the single-sector entry format. FIG. 4(b) shows the multi-sector entry format. FIG. 4(c) shows the two-dimensional sector entry format. Defects can be appropriately registered in a limited RAM capacity by selecting an appropriate format according to states of the defects on a magnetic disk.

For a more complete understanding of the present invention, reference is made to the following detailed description taken in conjunction with the accompanying drawings.

DETAILED DESCRIPTION OF THE INVENTION

As mentioned above, several format types have been proposed as PDM formats. The optimal PDM format, however, is such that it changes according to the status of the defects which have been detected on the magnetic disk. For example, if memory capacities allocated to the PDM for the above entry formats are the same, the maximum number of entries of the single-sector entry format is the largest of the other entry formats. On the other hand, the two-dimensional entry format has the largest maximum number of defects that are registered. In terms of the processing time required for address conversion under normal operating conditions, the single-sector entry format is advantageous.

A medium drive according to an embodiment of the present invention includes a medium on which data is written, a memory for storing a defect map on which defective positions on the medium are registered, and a controller adapted to determine a format on the basis of the defects detected on the medium, and generate the defect map in accordance with the determined format. In this embodiment, a format is determined on the basis of the defects detected on the medium, and the above defect map is generated in accordance with the determined format. A defect map appropriate for detected defects can therefore be generated.

The controller can execute defect detection tests on the medium and determine a format based on the defects that have been detected during the tests. This makes it possible to generate an appropriate defect map according to the defects detected during the defect detection tests of the medium.

In some embodiments, the controller selects one format from a plurality of formats each different in the number of defective positions that can be registered in one entry and in the amount of data used for one entry, and generate the defect map in accordance with the selected format. An appropriate format can thus be selected according to the number and status of detected defects.

The plurality of formats may include a first format and a second format which is larger than the first format in the number of defective positions that can be registered in one entry and in the amount of data used for one entry. In addition, the controller may use the first format if the number of entries registered in a defect map based on the first format is equal to or smaller than a reference number, and may use the second format if the number of entries registered in a defect map exceeds the reference number. An efficient defect map can thus be generated in a limited memory capacity. Furthermore, in some embodiments, the reference number is the total number of entries in the defect map based on the first format. The first format can thus be used with a higher probability.

In some embodiments of the present invention, the plurality of formats further include a third format larger than the second format in the number of defective positions that can be registered in one entry and in the amount of data used for one entry. In addition, the controller may use the third format if the number of entries registered in a defect map based on the second format exceeds a reference number. An efficient defect map can thus be generated in a limited memory capacity.

The controller may generate a defect map based on the first format, registers defective positions, and if the number of entries registered exceeds a reference number, changes the defect map of the first format to a defect map of the second format. In addition, the plurality of formats further include a third format larger than the second format in the number of defective positions that can be registered in one entry and in the amount of data used for one entry. Furthermore, if the number of entries registered in the defect map based on the second format exceeds a reference number, the controller may change the defect map of the second format to a defect map of the third format. The processing time can be reduced by changing a format while generating a defect map.

In the first format, one defect address can be registered in one entry. In the second format, a defect address that is a reference and the number of defect addresses that are one-dimensionally continuous can be registered in one entry. In the third format, a defect address that is a reference, the number of defect addresses that are continuous in a first direction, and the number of defect addresses that are continuous in a second direction different from the first direction can be registered in one entry.

Another embodiment of the present invention provides a method of generating a defect map for registering positions of defects on a medium. The method includes the steps of: detecting the defects on the medium; determining a format based on the defects detected on the medium; generating the defect map in accordance with the determined format; and registering on the generated defect map the positions of the defects detected on the medium. Hence, a defect map appropriate for detected defects can be generated.

The above method may further include the steps of: generating a first defect map based on a first format; registering defective positions on the first defect map; if the number of entries registered on the first defect map exceeds a reference number, generating a second defect map based on a second format larger than the first format in the number of defective positions that can be registered in one entry and in the amount of data used for one entry; and registering on the second defect map the detects that have been detected on the medium.

According to the present invention, positions of defects on a medium can be registered in a more appropriate format.

Embodiments of the present invention will be described hereunder. In the description below and the accompanying drawings, some parts are omitted and simplified as appropriate for clarity of the description. Also, the same reference number is assigned to the same constituent element in each drawing. In addition, duplicated descriptions are omitted as necessary for the clarity.

One of the major features of certain embodiments of the present embodiment is a technique for registering defective positions on a medium in a defect map. The defect registration method of the present invention will be described taking a hard disk drive (HDD) as an example of a medium drive in the present embodiment. In order to facilitate understanding of the abovementioned feature of certain embodiments of the present embodiment, the entire configuration of the HDD will be first outlined below.

Figure 1:
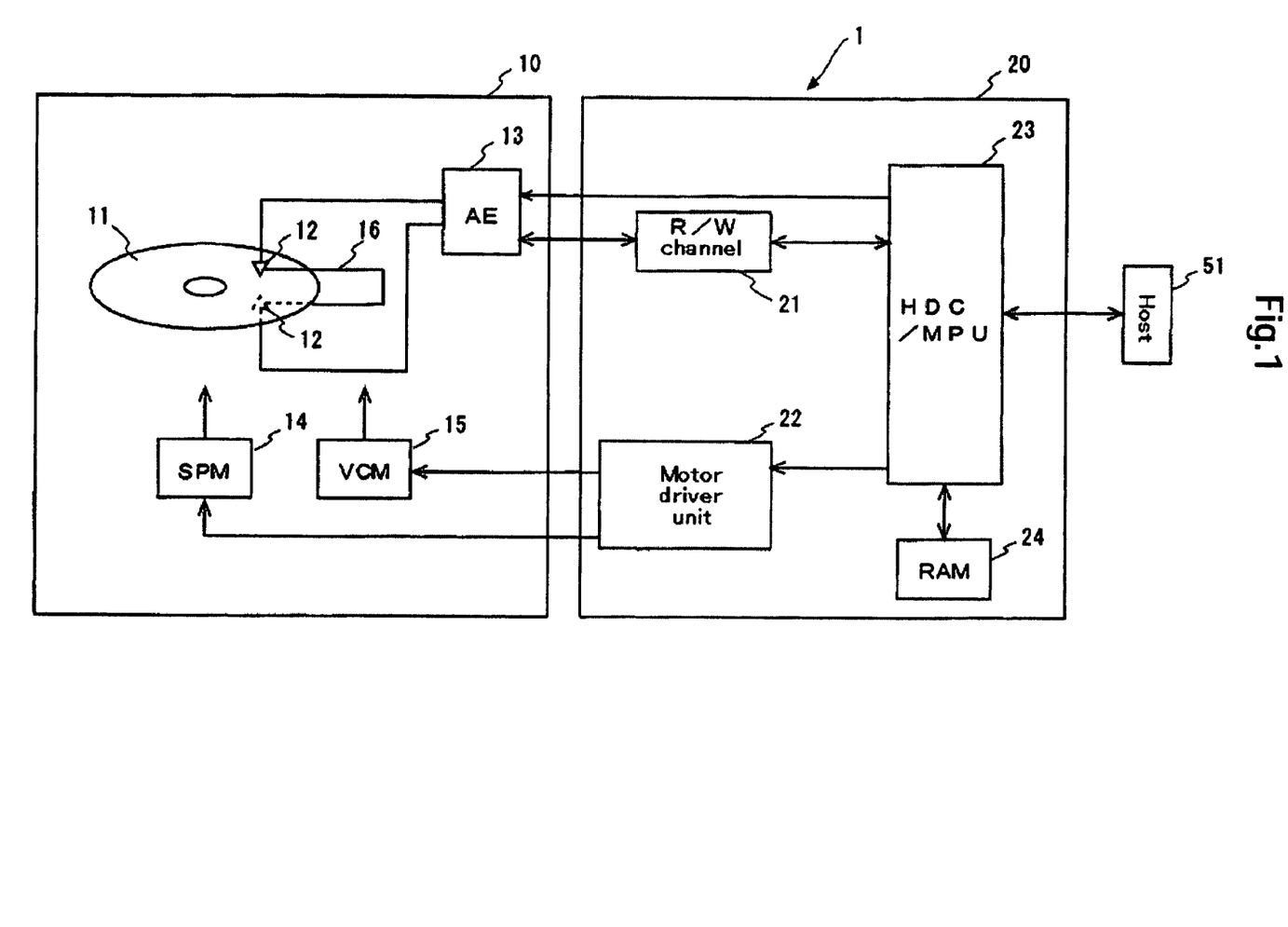
FIG. 1 is a block diagram showing schematically an entire configuration of a hard disk drive (HDD) according to an embodiment of the present invention.

FIG. 1 is a block diagram showing schematically the entire configuration of the HDD 1 according to an embodiment of the present invention. As shown in FIG. 1, the HDD 1 includes in an enclosure 10: a magnetic disk 11 that is an example of a medium on which data is written, a head slider 12, arm electronics (AE) 13, a spindle motor (SPM) 14, a voice coil motor (VCM) 15, and an actuator 16.

The HDD 1 also has a circuit board 20 fixed to the outside of the enclosure 10. A read/write channel (R/W channel) 21, a motor driver unit 22, an integrated circuit 23 including a hard disk controller (HDC) and a microprocessing unit (MPU) in combination (hereinafter, this circuit is called the HDC/MPU 23), a RAM 24, and other ICs are arranged on the circuit board 20. Constituent elements of each circuit can be integrated into one IC or mounted separately in a plurality of ICs.

User data transmitted from an external host 51 is received by the HDC/MPU 23 and then written onto the magnetic disk 11 by the head slider 12 through the R/W channel 21 and the AE 13. User data that has thus been stored on the magnetic disk 11 is read out by the head slider 12, and the read user data is output from the HDC/MPU 23 to the external host 51 through the AE 13 and the R/W channel 21.

The magnetic disk 11 is fixed to the SPM 14. The SPM 14 causes the magnetic disk 11 to rotate at a required angular velocity. The motor driver unit 22 drives the SPM 14 in accordance with control data from the HDC/MPU 23. The magnetic disk 11 in the present example has a data recording surface on both sides thereof, and head sliders 12 are provided supporting the recording surfaces. Each head slider 12 includes a slider section that flies above the magnetic disk, and a head element section that is fixed to the slider section and performs conversions between a magnetic signal and an electrical signal.

Each head slider 12 is fixed to the front end of the actuator 16. The actuator 16 is coupled directly to the VCM 15, and pivots about a rotating shaft to move the head slider 12 in the radial direction of the rotating magnetic disk 11, on the surface of the disk. The motor driver unit 22 drives the VCM 15 in accordance with the control data (hereinafter, called DACOUT) from the HDC/MPU 23. The number of magnetic disks 11 may be one or more, and a recording surface may be formed on one side or both sides of the magnetic disk 11.

The AE 13 selects, from a plurality of heads (head element sections) 12, one head slider 12 to access the magnetic disk 11, then amplifies at a definite gain level a read signal reproduced by the selected head slider 12, and transmits the read signal to the R/W channel 21. Also, a write signal from the R/W channel 21 is transmitted to the selected head.

During read processing, the R/W channel 21 that has received the read signal supplied from the AE 13 amplifies the read signal so as to obtain constant amplitude. Additionally, the R/W channel 21 extracts data from the obtained read signal and decodes the data. Data that is read out after being decoded includes user data and servo data. The decoded read user data is supplied to the HDC/MPU 23. During write processing, the R/W channel 21 performs code modulations on write data that has been supplied from the HDC/MPU 23, then further converts the code-modulated write data into a write signal, and supplies the write signal to the AE 13.

The MPU in the HDC/MPU 23 operates according to microcodes that have been loaded into the RAM 24. As the HDD 1 starts operating, the data required for control and data processing, in addition to the microcodes operating on the MPU, is loaded from the magnetic disk 11 or a ROM (not shown). The HDC/MPU 23 executes necessary processing relating to data processing, such as read/write processing control, command execution priority management, positioning control (servo control) of the head 12 using a servo signal, interface control, and defect management. The HDC/MPU 23 also executes total control of the HDD 1. In some embodiments, the HDC/MPU 23 selects an appropriate map format for generation of a defect map used for defect management, and registers defects in accordance with the map format. The selection of a map format and the registration of defects will be described in detail later herein.

Figure 2:
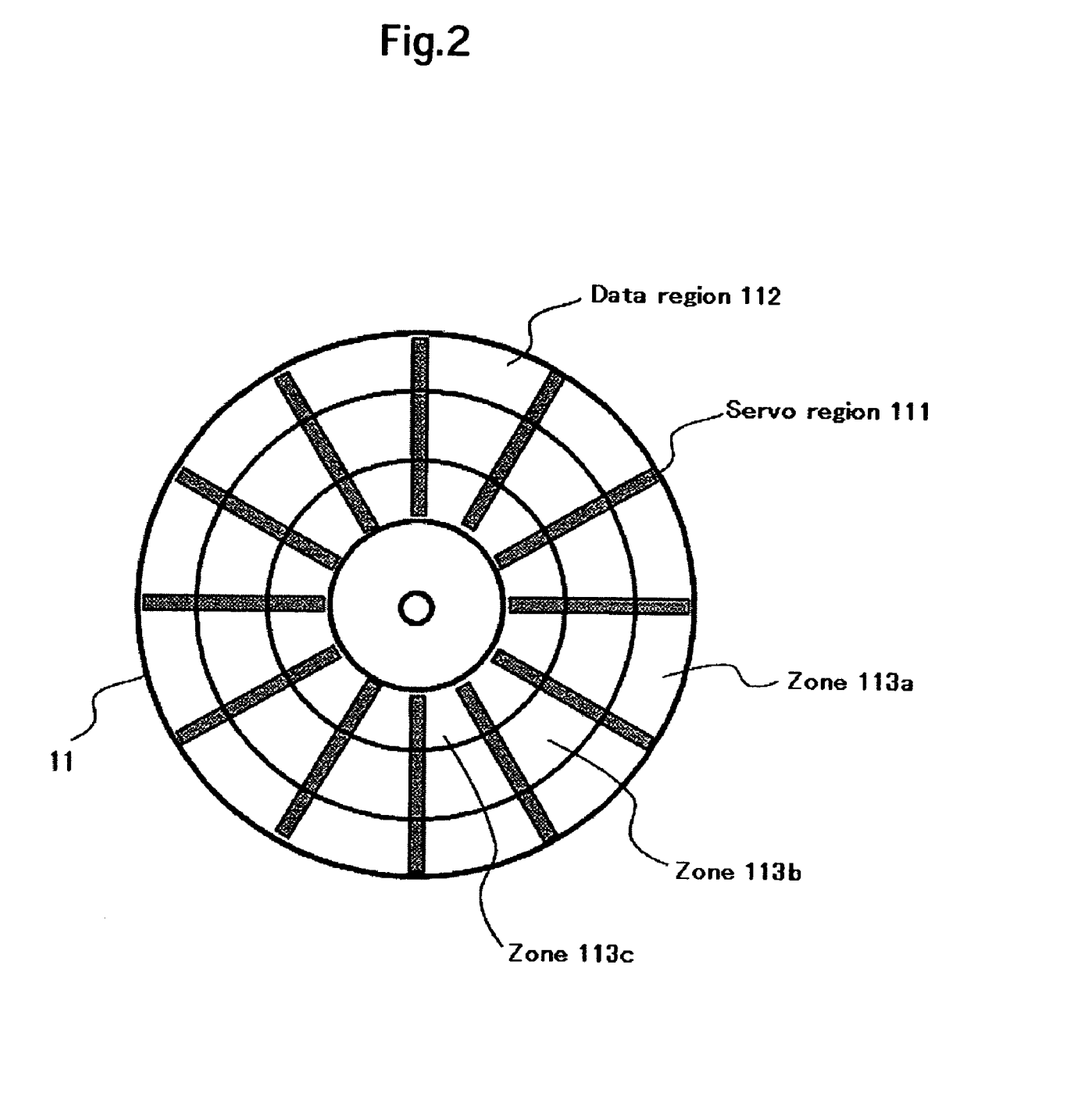
FIG. 2 is a diagram schematically showing a data format of data written on a magnetic disk according to an embodiment of the present invention.

FIG. 2 schematically shows a state of the data written on the recording surface of the magnetic disk 11. The recording surface of the magnetic disk 11 has a plurality of servo regions 111 each extending radially from the center of the disk 11 in the radial direction thereof, and spaced at required angle intervals, and a plurality of data regions 112 each interposed between two adjacent servo regions 111. Servo data intended to conduct positioning control of the head 12 is written in each servo region 111. User data is written in each data region 112.

A plurality of tracks each having a required width in the radial direction of the magnetic disk 11 are formed concentrically in the servo region 111 and in the data region 112. Servo data and user data are written along servo tracks and data tracks, respectively. The servo tracks and the data tracks may be arranged at the same or different radial positions as/from the other kind of tracks. Each servo track has a plurality of sets of servo data disposed separately from one another at required angle intervals.

Also, each data track has a plurality of data sectors (a recording unit of user data) in the data region 112 lying between two servo regions 111. User data is addressed on the basis of a data sector. In the example of FIG. 2, the data tracks are grouped into a plurality of zones 113a to 113c according to a particular radial position on the magnetic disk 11. The recording density of the entire magnetic disk 11 can be improved by setting recording frequencies of zones located on the outer circumference side (OD side) of the magnetic disk 11 higher than those of zones located on the inner circumference side (ID side) thereof and by changing the recording frequency on a zone basis.

As mentioned above, the HDD 1 of embodiments of the present invention is characterized by generation of defect maps used for defect management. Accordingly, defect sector management under normal operating conditions of the HDD 1 is described below with reference to the block diagram shown in FIG. 3. The HDD 1 makes reference to a primary defect map (PDM) 242 and a reassign defect map (RDM) 243 and manages defective data sectors (hereinafter, called a "defective sector"). The PDM 242 identifies defective sectors that have been detected during the manufacturing processes for the HDD 1. The HDD 1 skips the defective sectors that have been registered on the PDM 242.

Figure 3:
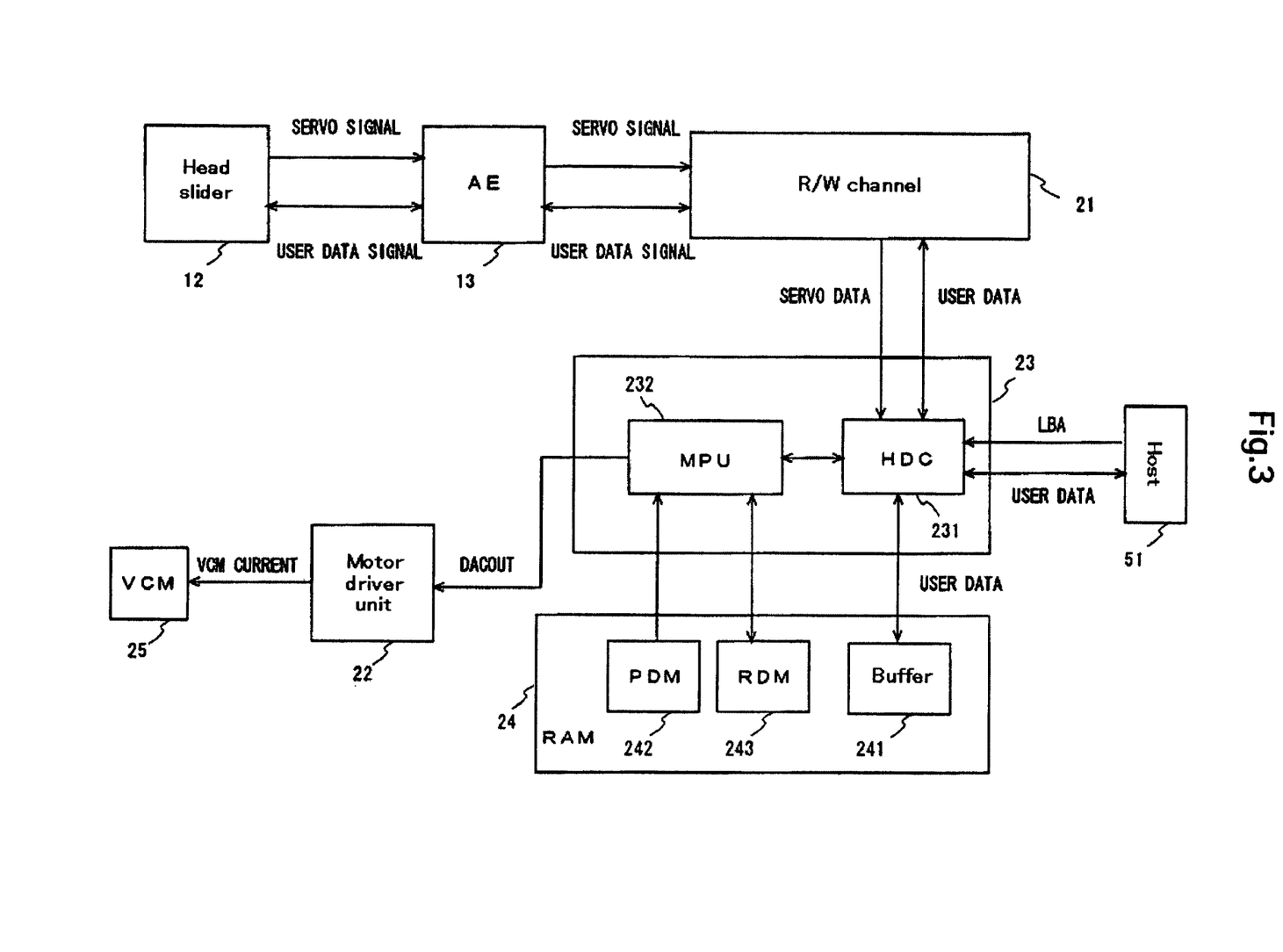
FIG. 3 is a block diagram showing schematically a configuration used to manage defective sectors under normal operating conditions of the HDD according to an embodiment of the present invention.

The RDM 243 identifies the defective sectors detected during use of the HDD 1, and alternative sectors corresponding to the defective sectors. The HDD 1, after detecting a defective sector during the use of the HDD, registers the defective sector and an associated alternative sector on the RDM 243. After receiving from the host 51 an access request for the defective sector registered on the RDM 243, the HDD 1 accesses the associated alternative sector on the RDM 243.

Details of the above are described below. For example, the host 51 transmits a read command and a logical block address (LBA) of an access destination together to the HDC/MPU 23 during the read processing. After receiving the command and the LBA through the HDC 231, the MPU 232 makes reference to the PDM 242 and RDM 243 stored within the RAM 24 and locates a physical address CHS (Cylinder Head Sector) corresponding to the LBA.

After receiving servo data from the R/W channel 21 through the HDC 231, the MPU 232 determines, from the servo data and the target CHS, an electric current value that is to be given to VCM 25, and then outputs DACOUT data indicative of the electric current value, to the motor driver unit 22. The motor driver unit 22 then supplies a VCM current to the VCM 25 in accordance with the DACOUT data.

The R/W channel 21 generates servo data and user data from a servo signal and a user data signal that are transmitted from the head slider 12 through the AE 13. The HDC 231 temporarily stores the user data into a buffer 241 of the RAM 24 and then transfers the user data to the host 51. A flow of user data during the write processing is opposite to that of the user data during the read processing.

As described above, the HDD 1 manages defective sectors using the PDM 242 and the RDM 243. The HDD 1 of embodiments of the present invention determines an appropriate map format based on the number of defective sectors registered on the PDM 242 and/or the RDM 243, and generates a defect map using the map format. This method of generating a defect map in the embodiment is particularly suitable for generation of the PDM 242. The generation of the PDM 242 is therefore described in detail hereunder.

The HDD 1 registers on the PDM 242 the defective sectors that have been detected during defect detection tests of the magnetic disk 11 in the manufacturing processes of the HDD. The HDD 1 may autonomously execute the defect detection tests of the magnetic disk 11. Hereinafter, the defect detection tests are collectively called a SRST (Self-Run Self-Test). The HDD 1 executes SRST using, in combination, its mechanical mechanism and the control circuit implemented as a product element.

During the manufacturing processes for the HDD 1, a head stack assembly that is an assembly of the head 12 and the actuator 16, the magnetic disk 11, and other necessary components are mounted in the enclosure 10, whereby a head disk assembly (HDA) is manufactured. Furthermore, a control circuit board 20 with necessary circuits mounted thereon is mounted outside the HDA. After the phase of assembling the HDD 1 as a product, the HDD executes the SRST using the circuits and mechanism of the HDD 1.

In the SRST, several types of defect detection tests, such as a Surface Analysis test (SAT) and a Fill Data test, are performed on the recording surface of the magnetic disk 11. These tests are outlined below. In the SAT, data is written onto each data track of the magnetic disk 11 and then the written data is read out to identify defects on the magnetic disk 11. In the Fill Data test, data write processing onto the magnetic disk 11 is executed, and the servo tracks that cause a write error and data sectors corresponding to those servo tracks are identified. The HDD 1 registers SAT results and detected defective sectors on the PDM 242.

The HDD 1 of embodiments of the present invention uses three PDM formats: a single-sector entry format; a multi-sector entry format; and a two-dimensional sector entry format. FIGS. 4(a) to 4(c) schematically show methods of registering defective sectors in the each format. FIG. 4(a) shows the single-sector entry format. FIG. 4(b) shows the multi-sector entry format. FIG. 4(c) shows the two-dimensional sector entry format.

Each rectangle in FIGS. 4(a) to 4(c) denotes data sectors. Hatched rectangles 117 denote data sectors registered as defective sectors. Sections 118 each surrounded with a bold line denote defective sectors registered in one entry. An arrow denotes a rotating direction of the magnetic disk 11.

Figure 5:
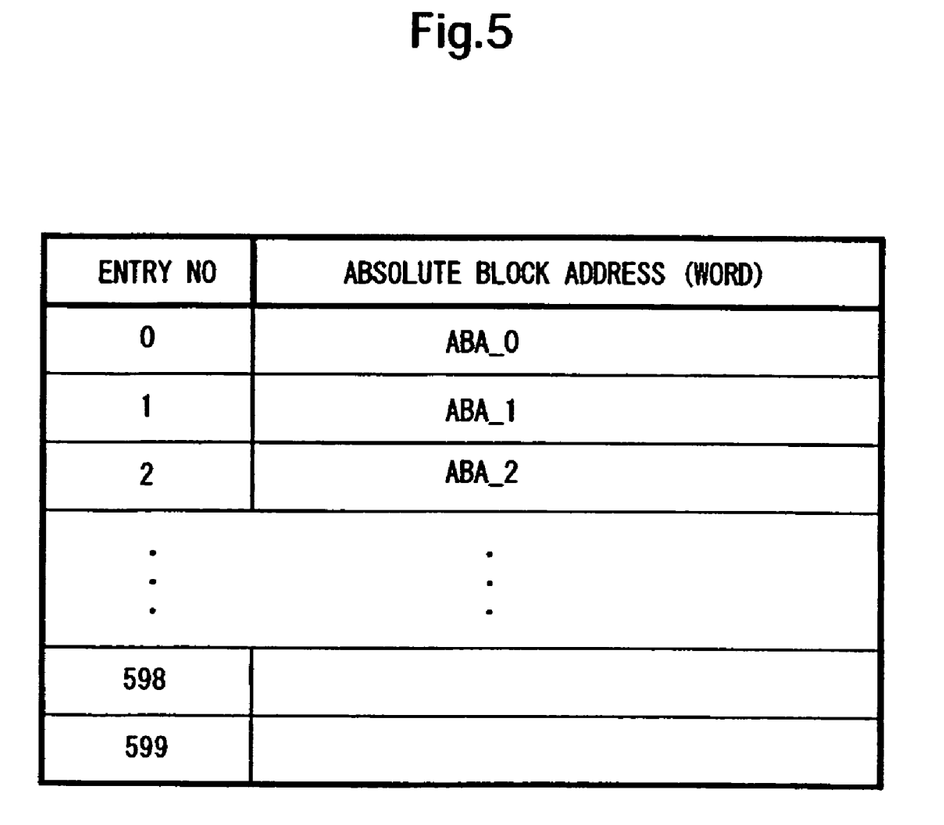
FIG. 5 schematically shows an example of a PDM of the single-sector entry format according to an embodiment of the present invention.

In the single-sector entry format, as shown in FIGS. 4(a) and 5, an address of one defective sector 117a (118a) is registered in each entry. An absolute address block address (ABA) of the defective sector is stored within each entry identified by entry number (ENTRY NO). The number of defective sectors, therefore, matches with the number of entries in which absolute block addresses are registered. In the example of FIG. 4(a) that shows 11 defective sectors, the number of entries in which an ABA is stored is also 11. In this example, the ABA is one of physical addresses serially assigned to each data sector including a defective sector.

Figure 6:
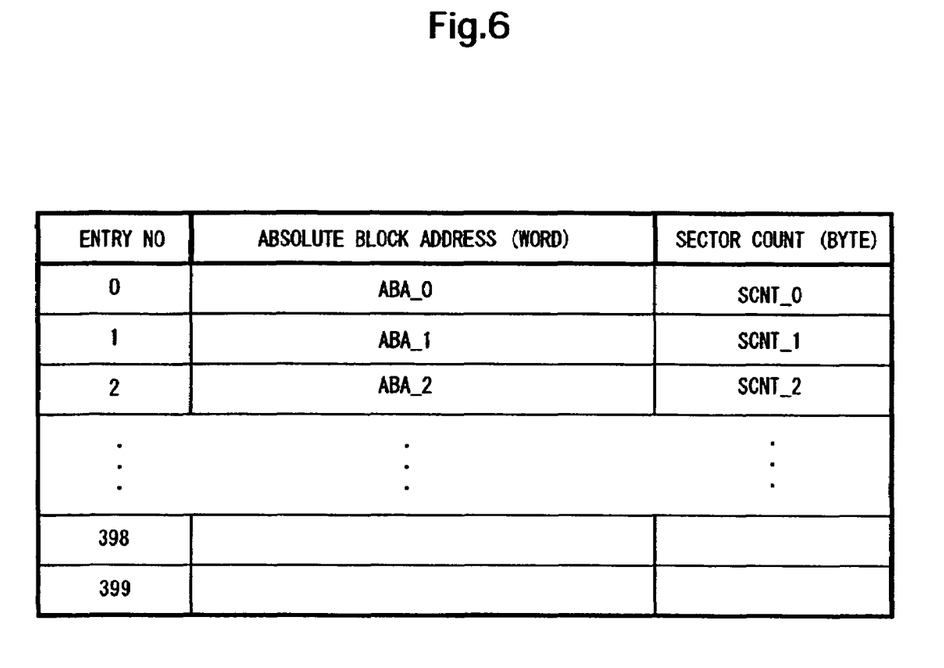
FIG. 6 schematically shows an example of a PDM of the multi-sector entry format according to an embodiment of the present invention.

In the multi-sector entry format, as shown in FIG. 4(b), a one-dimensional array of defective sectors 118b in the circumferential direction is registered in each entry. More specifically, as shown in FIG. 6, an ABA of a first defective sector 117b and the number of sectors (SECTOR COUNT) following the first defective sector 117b are stored in each entry. In the example of FIG. 4(b), the number of registered entries is 2, the registered SECTOR COUNT in the defective sector array on the OD side is 6, and the registered SECTOR COUNT in the defective sector array on the ID side is 7.

Figure 7:
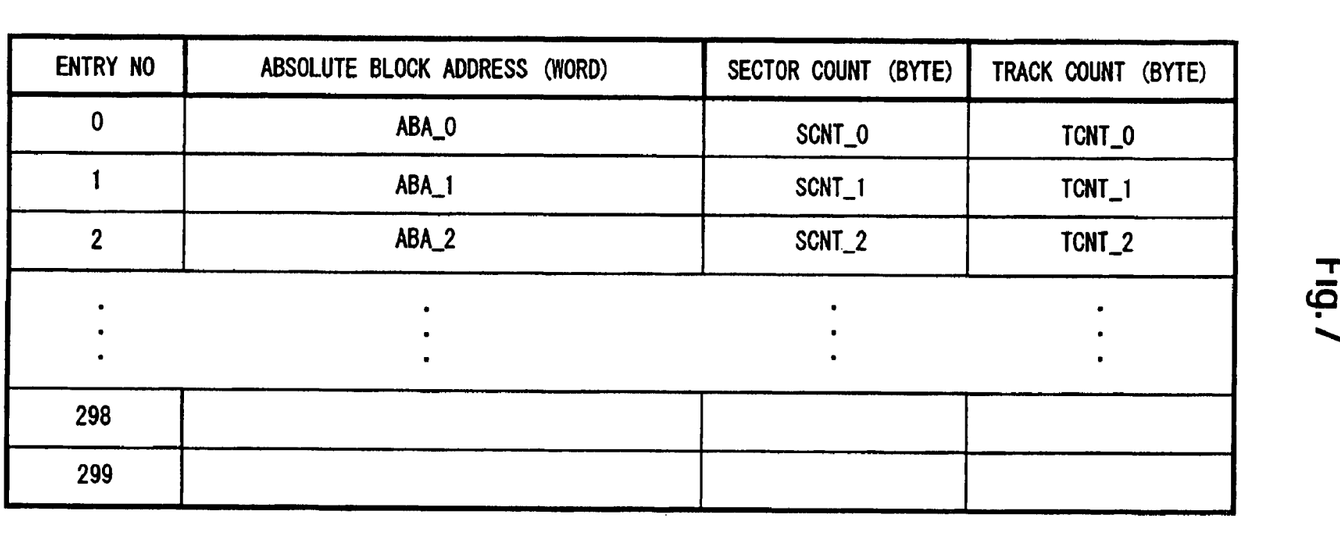
FIG. 7 schematically shows an example of a PDM of the two-dimensional sector entry format according to an embodiment of the present invention.

In the two-dimensional sector entry format, as shown in FIG. 4(c), a two-dimensional array of defective sectors 118c in circumferential and radial directions is registered in each entry. More specifically, as shown in FIG. 7, an ABA of the first defective sector 117c in the two-dimensional array, the number of sectors (SECTOR COUNT) following the first defective sector 117c in the circumferential direction, and the number of tracks (TRACK COUNT) following the first defective sector 117c in the radial direction are stored in each entry. In the example of FIG. 4(c), the number of registered entries is 1, the SECTOR COUNT is 6, and the TRACK COUNT is 3.

Figure 8:
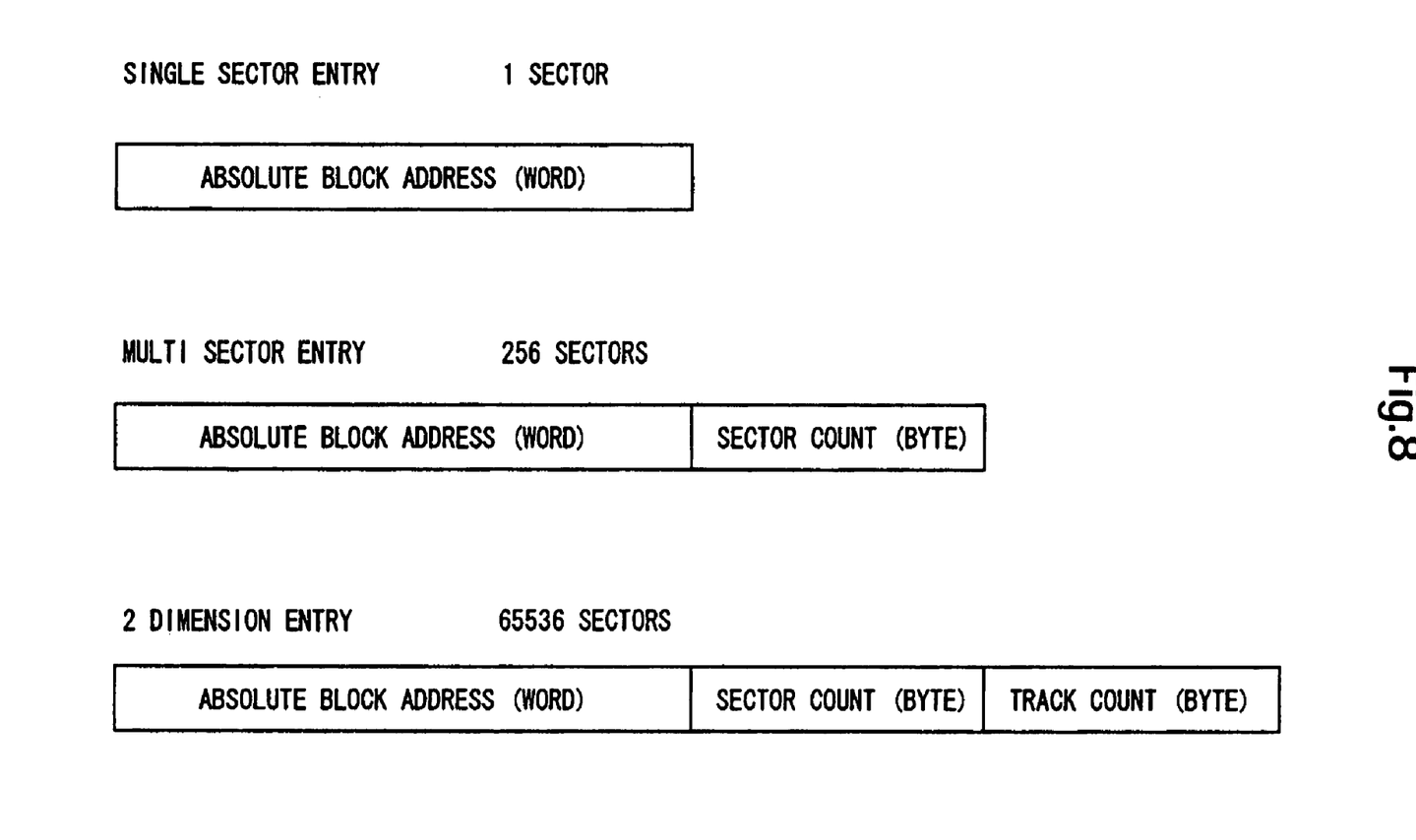
FIG. 8 is a diagram showing, for each PDM format according to an embodiment of the present invention, the kind of data stored in one entry and the maximum number of defective sectors that can be registered in one entry.

FIG. 8 shows data stored in one entry in each PDM format and the maximum number of defective sectors that can be registered in one entry. In these formats shown as examples, ABA is expressed as one word, and the SECTOR COUNT and the TRACK COUNT are both expressed as one byte. In one entry in the single-sector entry format, the maximum number of sectors is one. A maximum of 256 data sectors can be stored per entry in the multi-sector entry format. A maximum of 65,536 data sectors can be stored per entry in the two-dimensional sector entry format.

As can be seen from the above, the number of sectors that can be registered in one entry increases in the order of the single-sector entry format, the multi-sector entry format, and the two-dimensional sector entry format. If a memory capacity allocated to the PDM 242 is the same, however, the maximum number of entries that can be registered on the PDM 242 decreases in the order of the single-sector entry format, the multi-sector entry format, and the two-dimensional sector entry format.

Figure 9:
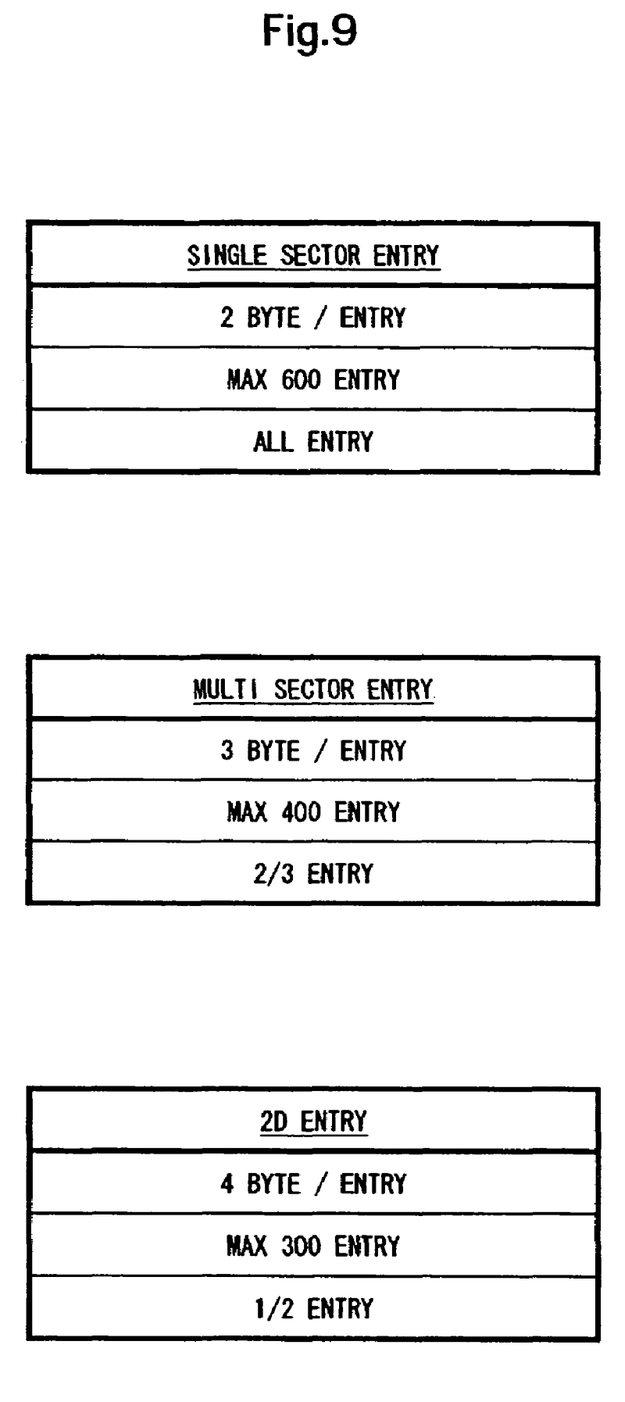
FIG. 9 shows an example of the number of entries that can be stored in each PDM format.

FIG. 9 shows an example of the number of entries that can be stored in each PDM format. The number of bytes of each data element is the same as that of the data mentioned above. If the maximum number of entries that can be registered in the single-sector entry format is 600, the maximum number of entries that can be registered in the multi-sector entry format is 400 and the maximum number of entries that can be registered in the two-dimensional sector entry format is 300.

A larger number of entries can be registered in the multi-sector entry format than in the single-sector entry format. In the multi-sector entry format, however, since defective sectors are registered on a sector column basis, if the defective sectors exist discretely, originally normal data sectors are also registered as defective sectors.

In the two-dimensional sector entry format, although an even greater number of defective sectors can be registered, an even greater number of normal sectors are correspondingly registered as defective sectors. In the multi-sector entry format or the two-dimensional sector entry format, although one defective sector can also be registered in one entry, the maximum number of entries that can be registered decreases, which decreases the number of defective sectors that can be registered.

In terms of a data capacity available on the magnetic disk 11, therefore, it is preferable that the HDD 1 use a PDM format in which the number of defective sectors stored in one entry is small. That is, if the number of defective sectors is small, preferably the multi-sector entry format, or further preferably the single-sector entry format is used.

In addition, as described above, with respect to access to the magnetic disk 11 in response to a command from the host 51, the HDC/MPU 23 makes reference to the PDM 242 and determines the CHS to be accessed. The processing time required at this time or the complexity level of the processing may vary depending on the PDM format used. More specifically, the processing time or the complexity level of the processing increases in the order of the single-sector entry format, the multi-sector entry format, and the two-dimensional sector entry format.

The HDC/MPU 23 uses an LBA to communicate with the host 51, and uses a CHS to access the medium. The HDC/MPU 23 identifies the CHS to be accessed based on the LBA obtained from the host 51. At this time, the HDC/MPU 23 makes reference to the PDM 242, extracts an ABA of a data sector to be skipped, and uses the extracted ABA to identify the CHS to be accessed.

Unlike the single-sector entry format in which defects are registered on a sector basis, in the multi-sector entry format and the two-dimensional sector entry format, defective sectors in a compressed state are registered. In the latter two formats, therefore, more arithmetic operations are required for the HDC/MPU 23 to extract a necessary ABA from the PDM 242. Even more arithmetic operations are required in the two-dimensional sector entry format than the multi-sector entry format since a compression ratio in the two-dimensional sector entry format is larger than that in the multi-sector entry format. Since the calculation of the target CHS that uses the PDM 242 is a widely known technique, as disclosed in literature such as U.S. Pat. Nos. 6,654,904 and 6,850,379, a description of this technique is omitted herein.

If all defective sectors can be registered on the PDM 242 in the single-sector entry format, therefore, the single-sector entry format is preferably used. If the number of detected defective sectors exceeds the maximum number of entries that can be registered in the single-sector entry format, the multi-sector entry format is preferably used. If the number of detected defective sectors exceeds the maximum number of entries that can be registered in the multi-sector entry format, all defective sectors can be registered on the PDM 242 by using the two-dimensional sector entry format.

In the SRST, the HDC/MPU 23 in the present embodiment first uses the single-sector entry format to generate the PDM 242 and register detected defective sectors thereon. After this, if the number of entries to be registered exceeds the maximum number of entries that can be registered, the HDC/MPU 23 changes the format to the multi-sector entry format, generates a new PDM 242 (by changing the above PDM 242), and re-registers the detected defective sectors thereon. If the number of entries to be registered further exceeds the maximum number of entries that can be registered in the multi-sector entry format, the HDC/MPU 23 changes the format to the two-dimensional entry format, generates another new PDM 242, and re-registers the detected defective sectors thereon.

Figure 10:
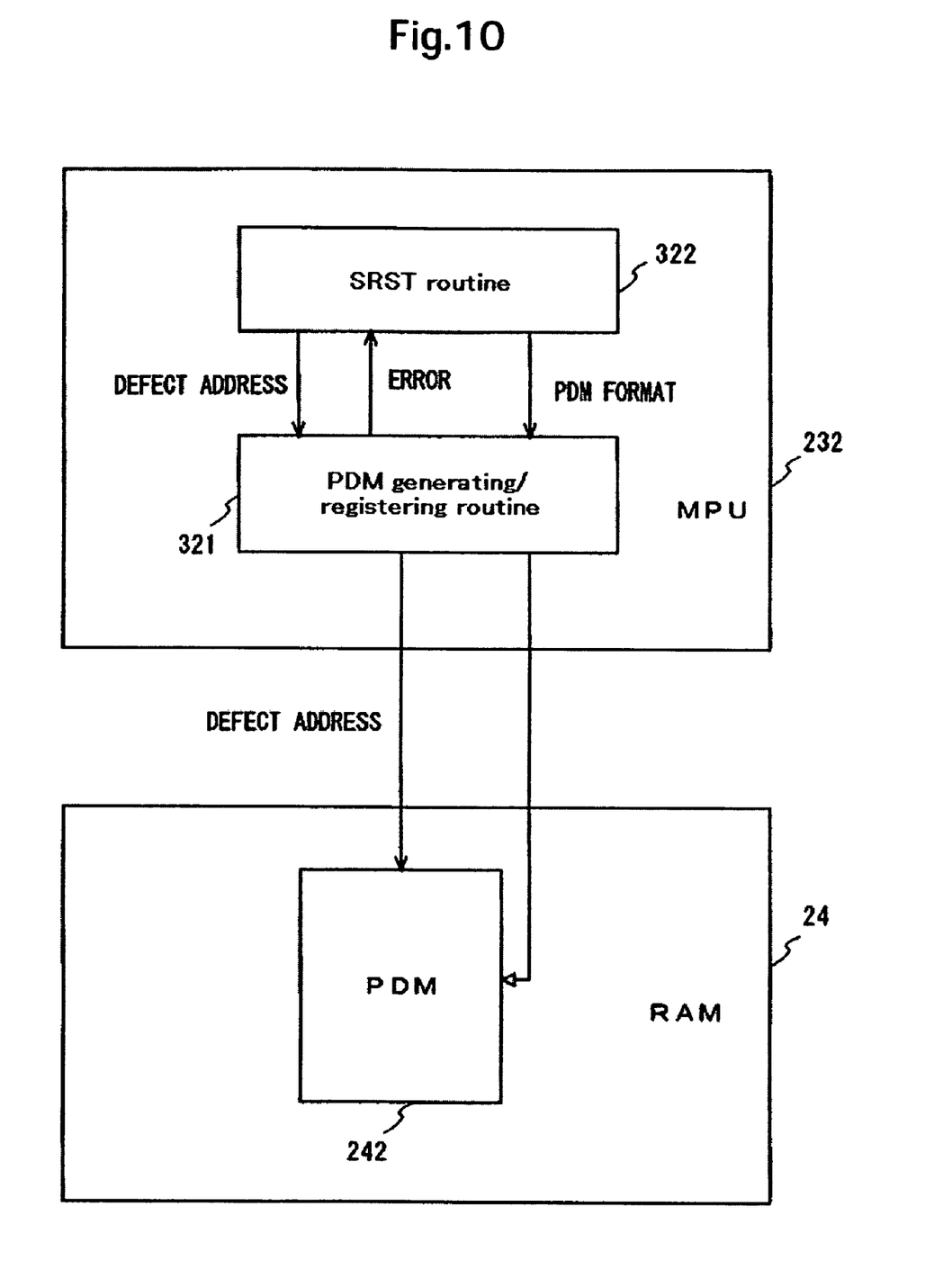
FIG. 10 is a block diagram showing schematically a configuration used to generate a PDM and register defective sectors on the PDM according to an embodiment of the present invention.

As shown in FIG. 10, a PDM generating/registering routine 321 repeatedly executes the generation (including change) of the PDM 242 and the registration of defective sectors thereon. The PDM generating/registering routine 321 is a program that operates on the MPU 232, and functions as a PDM generating/registering unit since the MPU 232 executes arithmetic processing in accordance with this routine. An SRST routine 322 is a program that operates on the MPU 232. The SRST routine 322 executes the SRST of the magnetic disk 11 by using the functions normally implemented in the HDD 1.

In the SRST, the SRST routine 322 sends a PDM FORMAT instruction to the PDM generating/registering routine 321, which then generates the PDM 242 in accordance with the instruction. Additionally, the SRST routine 322 passes an ABA (DEFECT ADDRESS) of a detected defective sector to the PDM generating/registering routine 321. The PDM generating/registering routine 321 registers the passed ABA on the PDM 242.

If the number of defective sectors to be registered exceeds the maximum number of entries that can be registered, the PDM generating/registering routine 321 returns an ERROR signal to the SRST routine 322 to indicate that the maximum number of entries that can be registered has been exceeded. The SRST routine 322, after being notified of this error, instructs the PDM generating/registering routine 321 to generate the next PDM format (multi-sector entry or two-dimensional sector entry format). Similar processing is subsequently executed as necessary.

Figure 11:
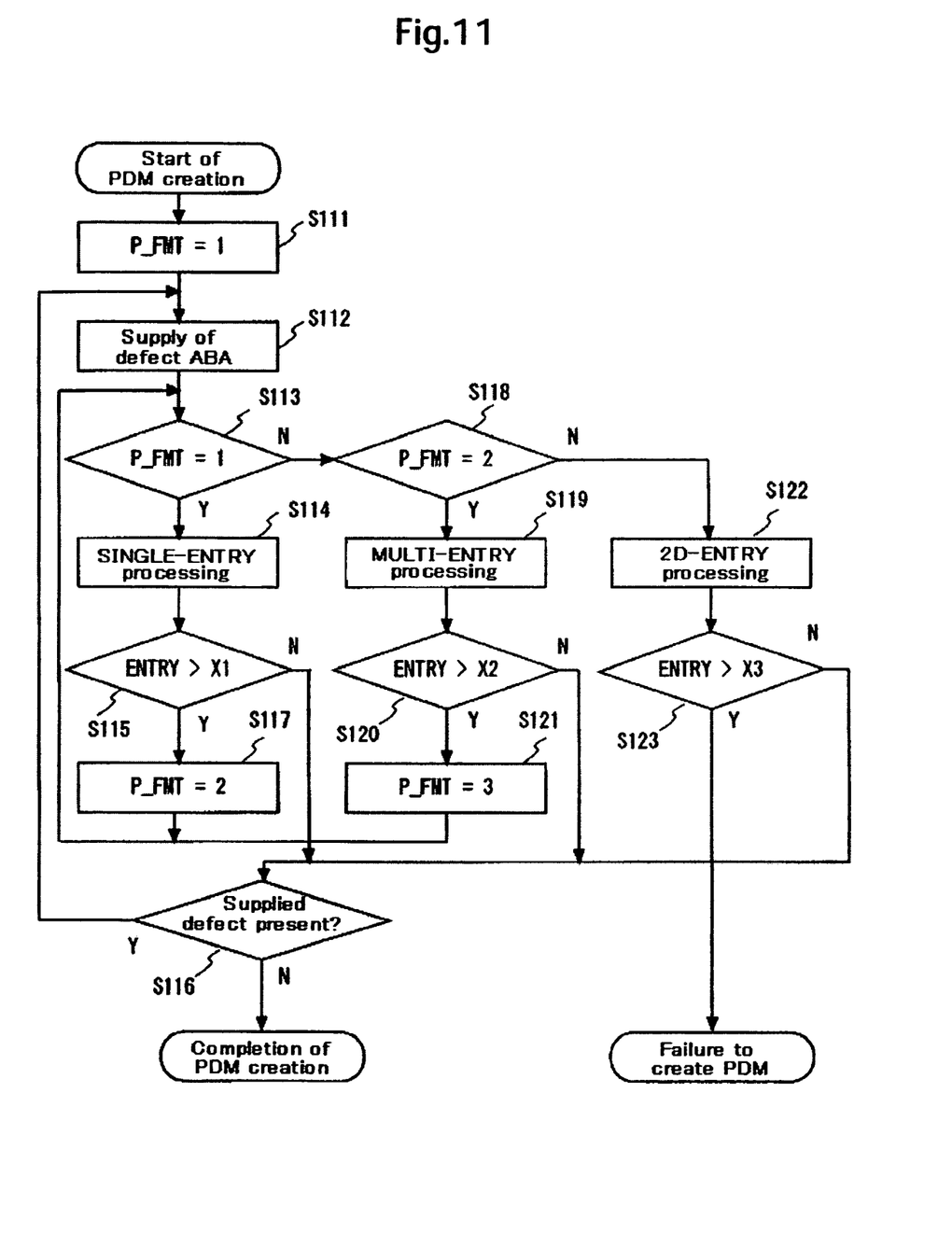
FIG. 11 is a flow chart that shows registration of defective sectors on a PDM in a SRST according to an embodiment of the present invention.

A description will be made of the registration of defective sectors on the PDM 242 in the SRST referring to the flow chart of FIG. 11. After starting the SRST and detecting a defective sector, the SRST routine 322 sets PDM format "1" (P_FMT=1) in the PDM generating/registering routine 321 in step S111 and then passes the ABA of the defective sector to the PDM generating/registering routine 321 in step S112. Since the specified PDM format is "1", that is, since a response in step S113 is Y (Yes), the PDM generating/registering routine 321 registers the defective sector on the PDM 242 of the single-sector entry format in step S114.

If the number of entries is not in excess of X1 (the maximum number of entries that can be registered in the single-sector entry format), that is, a response in step S115 is N (No) and a response in step S116 is Y, the SRST routine 322 and the PDM generating/registering routine 321 repeat the above steps for the detected defective sector. Creation of the PDM is completed if the SRST ends without a defective sector being detected (i.e., if N in S116).

If the number of entries is in excess of X1 (the maximum number of entries that can be registered in the single-sector entry format), that is, if the response in S115 is Y, the SRST routine 322 sets PDM format "2" (P_FMT=2) in the PDM generating/registering routine 321 in step S117 and passes the ABA of the defective sector to the PDM generating/registering routine 321 in step S112. Since the specified PDM format is "2" (N in S113 and Y in S118), the PDM generating/registering routine 321 registers the defective sector on the PDM 242 of the multi-sector entry format in step S119.

If the number of entries is not in excess of X2 (the maximum number of entries that can be registered in the multi-sector entry format), that is, a response in step S120 is N and the response in S116 is Y, the SRST routine 322 and the PDM generating/registering routine 321 repeat the above steps for the detected defective sector. The creation of the PDM is completed if the SRST ends without a defective sector being detected (i.e., if N in S116).

If the number of entries is in excess of X2 (the maximum number of entries that can be registered in the multi-sector entry format), that is, if the response in S120 is Y, the SRST routine 322 sets PDM format "3" (P_FMT=3) in the PDM generating/registering routine 321 in step S121 and passes the ABA of the defective sector to the PDM generating/registering routine 321 in step S112. Since the specified PDM format is "3" (N in S113 and N in S118), the PDM generating/registering routine 321 registers the defective sector on the PDM 242 of the two-dimensional sector entry format in step S122.

If the number of entries is not in excess of X3 (the maximum number of entries that can be registered in the two-dimensional sector entry format), that is, a response in step S123 is N and the response in S116 is Y, the SRST routine 322 and the PDM generating/registering routine 321 repeat the above steps for the detected defective sector. The creation of the PDM is completed if the SRST ends without a defective sector being detected (i.e., if N in S116). If the number of entries is in excess of X3 (if Y in S123), since no more defective sectors can be registered on the PDM 242, the creation thereof is processed as an error.

As described above, selecting an appropriate PDM format according to a particular status of the defects on the magnetic disk 11 and then generating a PDM based on the format makes it possible to achieve efficient registration of the defects on the defect map or more efficient processing under normal operating conditions.

It is to be understood that the present invention is not limited to the described embodiments. Persons skilled in the art can easily make modifications, additions, and/or rearrangements to each element of the embodiments within the scope of the invention. For example, the HDD may be constructed so as to change the PDM format when the number of registered entries reaches a reference value less than the maximum number of the registered entries. In addition, the present invention may be applied not only to the generation of PDMs in the SRST, but also to generation of other types of defect maps such as an RDM.

Furthermore, it is to be understood that the number of formats that can be used is not limited. Two or four or more formats may be used. Besides, a format change may also be performed in accordance with standards other than those described above. Although one defect map is preferably generated in accordance with one format, a defect map that uses a plurality of formats in a mixed form may be generated. In the examples described in the above embodiments, sector addresses are used as the data that expresses defect positions, other data may be used to express defect positions. Besides, the present invention may be applied to defect detection tests of other recording disks than magnetic disks.

What is claimed is:

1. A medium drive comprising:
   a medium for recording data;
   a memory for storing a defect map on which positions of defects on the medium are to be registered; and
   a controller for determining a format on the basis of the defects detected on the medium, and generating the defect map in accordance with the determined format.

2. The medium drive according to claim 1, wherein the controller executes defect detection tests on the medium and determine a format based on the defects that have been detected during the defect detection tests.

3. The medium drive according to claim 1, wherein the controller selects one format from a plurality of formats each different in the number of defect positions that can be registered in one entry and in the amount of data used for one entry, and generates the defect map in accordance with the selected format.

4. The medium drive according to claim 3, wherein:
   the plurality of formats include a first format and a second format that is larger than the first format in terms of the number of defect positions that can be registered in one entry and in terms of the amount of data that used for one entry; and
   the controller uses the first format if the number of entries registered in a defect map based on the first format is equal to or smaller than a reference number, and uses the second format if the reference number is exceeded.

5. The medium drive according to claim 4, wherein the reference number is a total number of entries in the defect map based on the first format.

6. The medium drive according to claim 4, wherein:
   the plurality of formats further include a third format larger than the second format in terms of the number of defect positions that can be registered in one entry and in terms of the amount of data used for one entry; and
   the controller uses the third format if the number of entries registered in a defect map based on the second format exceeds a reference number.

7. The medium drive according to claim 6, wherein, in the third format, a defect address that is a reference, the number of defect addresses that are continuous in a first direction, and the number of defect addresses that are continuous in a second direction different from the first direction are registered in one entry.

8. The medium drive according to claim 4, wherein the controller generates a defect map based on the first format, registers defect positions, and if the number of entries registered exceeds a reference number, changes the defect map of the first format to a defect map of the second format.

9. The medium drive according to claim 8, wherein:
   the plurality of formats further include a third format larger than the second format in terms of the number of defect positions that can be registered in one entry and in terms of the amount of data used for one entry; and
   if the number of entries registered in the defect map based on the second format exceeds a reference number, the controller changes the defect map of the second format to a defect map of the third format.

10. The medium drive according to claim 3, wherein:
    in the first format, one defect address is registered in one entry; and
    in the second format, a defect address that is a reference and the number of defect addresses that is one-dimensionally continuous are registered in one entry.

11. A method of generating a defect map on which positions of defects on a medium are registered, the method comprising the steps of:
    detecting the defects on the medium;
    determining a format based on the defects detected on the medium;
    generating the defect map in accordance with the determined format; and
    registering, on the generated defect map, the positions of the defects detected on the medium.

12. The method according to claim 11, further comprising the steps of:
    generating a first defect map based on a first format and registering defect positions on the first defect map;
    if the number of entries registered on the first defect map exceeds a reference number, generating a second defect map based on a second format larger than the first format in terms of the number of defect positions that can be registered in one entry and in terms of the amount of data used for one entry; and
    registering, on the second defect map, the defects that have been detected on the medium.

* * * * *